(12) United States Patent
Catlin et al.

(10) Patent No.: US 10,737,636 B2
(45) Date of Patent: Aug. 11, 2020

(54) VEHICLE INTERIOR COMPONENT

(71) Applicant: Shanghai Yanfeng Jinqiao Automotive Trim Systems Co. Ltd., Novi, MI (US)

(72) Inventors: Michael Robert Catlin, Holland, MI (US); Jason Mathew Hipshier, Hudsonville, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 14 days.

(21) Appl. No.: 16/262,238

(22) Filed: Jan. 30, 2019

(65) Prior Publication Data
US 2019/0232845 A1 Aug. 1, 2019

Related U.S. Application Data
(60) Provisional application No. 62/624,257, filed on Jan. 31, 2018.

(51) Int. Cl.
  *B60R 11/00* (2006.01)
  *B60R 13/02* (2006.01)
  (Continued)

(52) U.S. Cl.
  CPC ............. *B60R 13/02* (2013.01); *A47B 31/06* (2013.01); *B32B 1/02* (2013.01); *B32B 3/30* (2013.01);
  (Continued)

(58) Field of Classification Search
  CPC .................................................... A47B 31/06
  See application file for complete search history.

(56) References Cited

U.S. PATENT DOCUMENTS 711,042 A * 10/1902 Dusenbery ............... A47B 1/06
  108/68
868,423 A * 10/1907 Fuller ...................... A47B 1/06
  108/68
(Continued)

FOREIGN PATENT DOCUMENTS

DE  3033599 A1 * 3/1982 ............. A47C 1/143
DE  9403833 U1 * 5/1994 ............... E06B 9/13
(Continued)

OTHER PUBLICATIONS

Machine Translation of DE 19646936 A1, May 1998 (Year: 1998).*

*Primary Examiner* — Jeffrey A Vonch (57) ABSTRACT

A vehicle interior component is disclosed. The component may comprise a base comprising an opening and first and second layers extending through the opening. The first and second layers may form a structure extending through the opening to an extended position. The first layer may engage the second layer to form the structure. The first layer may separate from the second layer when retracted into the base. The structure may comprise a protrusion formed by the first layer with the second layer to move from a retracted position to the extended position. The protrusion may extend beyond the base by a first distance when the protrusion is retracted and by a second distance greater than the first when the protrusion is extended. The second layer may comprise a bottom; the first layer may comprise a top to couple to the bottom to form the structure as the structure extends.

20 Claims, 5 Drawing Sheets

(51) Int. Cl.
  *B60N 3/00* (2006.01)
  *A47B 31/06* (2006.01)
  *B32B 3/30* (2006.01)
  *B32B 7/06* (2019.01)
  *B60N 2/75* (2018.01)
  *B32B 1/02* (2006.01)
  *B60R 7/04* (2006.01)
  *B32B 1/06* (2006.01)
  *B32B 1/04* (2006.01)
  *B60R 7/08* (2006.01)
  *B60R 7/06* (2006.01)

(52) U.S. Cl.
  CPC ............... *B32B 7/06* (2013.01); *B60N 2/773* (2018.02); *B60N 3/002* (2013.01); *B32B 1/04* (2013.01); *B32B 1/06* (2013.01); *B60R 7/04* (2013.01); *B60R 7/06* (2013.01); *B60R 7/08* (2013.01); *B60R 11/00* (2013.01); *B60R 2011/0003* (2013.01); *B60R 2011/0005* (2013.01); *B60R 2011/0007* (2013.01); *B60R 2011/008* (2013.01); *B60R 2011/0043* (2013.01); *B60R 2011/0084* (2013.01); *B60R 2013/0287* (2013.01); *Y10T 428/2457* (2015.01); *Y10T 428/24182* (2015.01); *Y10T 428/24322* (2015.01); *Y10T 428/24612* (2015.01); *Y10T 428/24777* (2015.01)

(56) References Cited

U.S. PATENT DOCUMENTS

| | | | | |
|---|---|---|---|---|
| 1,246,085 A * | 11/1917 | Giard | ............ | A47B 1/06 108/68 |
| 1,577,600 A * | 3/1926 | Volpi | ............ | A47B 1/06 108/68 |
| 1,802,891 A * | 4/1931 | Girard | ............ | A47B 1/06 108/68 |
| 1,873,195 A * | 8/1932 | Giard | ............ | A47B 1/06 108/68 |
| 1,939,846 A | 12/1933 | Fenton | | |
| 2,061,750 A | 11/1936 | Birek | | |
| 2,515,847 A | 7/1950 | Winkler | | |
| 2,588,706 A * | 3/1952 | Davis | ............ | B60N 3/002 108/45 |
| 2,621,093 A * | 12/1952 | Merhige | ............ | B60N 3/002 108/45 |
| 2,626,194 A * | 1/1953 | Clower | ............ | B60N 3/002 108/45 |
| 2,778,698 A * | 1/1957 | Gaylord | ............ | A47B 1/06 108/33 |
| 2,848,291 A * | 8/1958 | Hafekost et al. | ............ | A47B 1/06 108/93 |
| 2,903,708 A | 9/1959 | Cole | | |
| 3,157,557 A | 11/1964 | Palmer | | |
| 3,238,595 A | 3/1966 | Schwartz et al. | | |
| 3,332,828 A | 7/1967 | Faria et al. | | |
| 3,431,875 A | 3/1969 | Boultinghouse | | |
| 3,661,687 A | 5/1972 | Spinney, Jr. et al. | | |
| 3,870,391 A * | 3/1975 | Nims | ............ | E06B 9/115 312/297 |
| 3,896,742 A * | 7/1975 | Ferraro | ............ | A47B 3/04 108/44 |
| 3,899,982 A * | 8/1975 | Fetzek | ............ | A47B 31/06 108/25 |
| 4,417,764 A * | 11/1983 | Marcus | ............ | B60N 2/793 297/188.17 |
| 4,645,157 A * | 2/1987 | Parker | ............ | B60N 3/102 248/311.2 |
| 4,718,354 A * | 1/1988 | Piretti | ............ | A47B 1/06 108/143 |
| 4,759,584 A * | 7/1988 | Dykstra | ............ | B60N 3/102 108/25 |
| 4,783,037 A * | 11/1988 | Flowerday | ............ | B60N 3/102 248/311.2 |
| 4,829,910 A * | 5/1989 | Lirette | ............ | A47B 3/00 108/35 |
| D313,963 S * | 1/1991 | Gunnarsson | ............ | D12/419 |
| 5,171,061 A * | 12/1992 | Marcusen | ............ | B60N 3/102 297/188.17 |
| 5,527,008 A * | 6/1996 | Schutter | ............ | B60N 3/102 248/311.2 |
| 5,527,084 A * | 6/1996 | Scherf | ............ | B60R 21/0428 296/153 |
| 5,765,736 A * | 6/1998 | Fischer | ............ | B60N 3/102 224/281 |
| 5,820,194 A * | 10/1998 | Slayter | ............ | B60N 3/001 296/70 |
| 6,010,047 A * | 1/2000 | Osborn | ............ | B60N 3/102 224/281 |
| 7,475,954 B1 * | 1/2009 | Latunski | ............ | B60R 11/00 296/24.34 |
| D593,930 S * | 6/2009 | Fossett | ............ | D12/420 |
| 8,579,348 B1 * | 11/2013 | Myers | ............ | B60R 7/04 296/24.34 |
| 9,428,118 B1 * | 8/2016 | Rawlinson | ............ | B60N 3/001 |
| 2002/0005424 A1 | 1/2002 | Lange | ............ | B60R 7/04 224/539 |
| 2002/0030375 A1 * | 3/2002 | Eguchi | ............ | B60R 7/04 296/37.8 |
| 2002/0163218 A1 * | 11/2002 | Stubbings | ............ | B60R 7/04 296/37.7 |
| 2003/0052129 A1 * | 3/2003 | Fukuo | ............ | B60N 3/102 220/350 |
| 2004/0080173 A1 * | 4/2004 | Niwa | ............ | B60R 7/04 296/24.34 |
| 2004/0100174 A1 * | 5/2004 | Yamamoto | ............ | B60N 3/102 312/332 |
| 2006/0186696 A1 * | 8/2006 | Dobos | ............ | B60R 7/04 296/152 |
| 2006/0266779 A1 * | 11/2006 | Mozer | ............ | B60N 3/007 224/543 |
| 2007/0045366 A1 * | 3/2007 | Kato | ............ | B60R 7/04 224/312 |
| 2008/0083517 A1 * | 4/2008 | Ogawa | ............ | E06B 9/15 160/222 |
| 2008/0129071 A1 * | 6/2008 | Hipshier | ............ | B60R 7/04 296/37.8 |
| 2008/0190329 A1 * | 8/2008 | Boyd | ............ | A47B 3/04 108/39 |
| 2010/0133866 A1 * | 6/2010 | Hipshier | ............ | B29C 45/1676 296/1.08 |
| 2012/0133254 A1 * | 5/2012 | Chupp | ............ | A47B 1/06 312/205 |
| 2012/0305202 A1 * | 12/2012 | Ganz | ............ | B60N 3/08 160/133 |
| 2012/0319440 A1 * | 12/2012 | Andersson | ............ | B60N 3/102 297/188.17 |
| 2013/0049389 A1 * | 2/2013 | Hipshier | ............ | B29C 44/12 296/1.08 |
| 2013/0082492 A1 * | 4/2013 | Andersson | ............ | B60N 3/102 297/188.17 |
| 2013/0147223 A1 * | 6/2013 | Zoehrens | ............ | B60J 1/20 296/37.8 |
| 2013/0214577 A1 * | 8/2013 | Mojtabavi | ............ | A47B 3/08 297/331 |
| 2013/0269886 A1 * | 10/2013 | Sato | ............ | B60R 7/04 160/327 |
| 2014/0021733 A1 * | 1/2014 | Hipshier | ............ | B60R 13/0262 296/1.08 |
| 2014/0167435 A1 * | 6/2014 | Sherburn | ............ | B60N 3/102 296/1.08 |
| 2014/0312084 A1 * | 10/2014 | Kuhn | ............ | B60R 7/04 224/400 |
| 2015/0184445 A1 * | 7/2015 | Lin | ............ | E06B 3/46 220/200 |
| 2015/0258939 A1 * | 9/2015 | Hipshier | ............ | B60R 7/04 160/229.1 |

(56) References Cited

U.S. PATENT DOCUMENTS

| | | | |
|---|---|---|---|
| 2015/0343963 A1* | 12/2015 | Angeletti | B60R 11/0241 |
| | | | 296/37.12 |
| 2016/0257257 A1* | 9/2016 | Flothmann | B60R 7/04 |
| 2016/0331125 A1* | 11/2016 | Banks | A47B 5/006 |
| 2017/0181536 A1* | 6/2017 | De Saulles | A47B 3/00 |
| 2017/0210255 A1* | 7/2017 | Jaradi | B60N 3/102 |
| 2017/0217378 A1* | 8/2017 | Rodriguez | B60R 7/10 |
| 2017/0246973 A1* | 8/2017 | Farooq | B60R 7/04 |
| 2017/0313229 A1* | 11/2017 | Isernio | B60N 3/007 |
| 2018/0370445 A1* | 12/2018 | Gillis | B60R 7/04 |
| 2019/0039535 A1* | 2/2019 | Boinais | B60R 13/0262 |
| 2019/0143869 A1* | 5/2019 | Sequi | B60N 3/002 |
| | | | 296/152 |
| 2020/0010004 A1* | 1/2020 | Becker | B60N 2/0232 |

FOREIGN PATENT DOCUMENTS

| | | | | |
|---|---|---|---|---|
| DE | 19516011 C1 * | 8/1996 | | B61D 37/00 |
| DE | 19646936 A1 | 5/1998 | | |
| DE | 19908130 A1 * | 8/2000 | | B60N 3/102 |
| DE | 19935762 A1 * | 2/2001 | | A47B 3/12 |
| DE | 102004003581 A1 * | 8/2005 | | B60R 11/02 |
| DE | 202006012228 U1 * | 10/2006 | | B60N 2/773 |
| DE | 102007036439 A1 * | 2/2009 | | B60R 7/06 |
| DE | 102011056355 A1 * | 6/2013 | | B64D 11/0638 |
| EP | 0778174 A1 * | 6/1997 | | B60N 3/002 |
| EP | 0842815 A2 * | 5/1998 | | B60N 3/102 |
| EP | 0872377 A2 * | 10/1998 | | B60N 3/108 |
| EP | 1591317 A1 * | 11/2005 | | B60R 7/04 |
| FR | 1430011 A * | 2/1966 | | A47B 3/04 |
| FR | 2752785 A1 * | 3/1998 | | B60R 5/045 |
| FR | 2892990 A1 * | 5/2007 | | B60R 7/06 |
| FR | 2909330 A3 * | 6/2008 | | B60N 3/102 |
| FR | 2984245 A1 * | 6/2013 | | B60K 37/00 |
| JP | 02057442 A * | 2/1990 | | B60N 3/002 |
| JP | 2007015437 A * | 1/2007 | | |
| JP | 2007190996 A * | 8/2007 | | |
| JP | 2008024099 A * | 2/2008 | | |

* cited by examiner

VEHICLE INTERIOR COMPONENT

CROSS-REFERENCE TO RELATED APPLICATIONS

The present application claims benefit of and incorporates by reference in full the following patent application: (a) U.S. Provisional Patent Application No. 62/624,257 titled "VEHICLE INTERIOR COMPONENT" filed Jan. 31, 2018.

FIELD

The present invention relates to a vehicle interior component.

BACKGROUND

It is known to provide convenience features in a vehicle interior including trays, armrests, doors and covers.

It would be advantageous to provide an improved vehicle interior component. It would also be advantageous to provide a cantilevered tray, armrest, door or cover configured to move from a retracted position to an extended position.

SUMMARY

The present invention relates to a component for a vehicle interior comprising a base comprising an opening, a first layer configured to be extended through the opening of the base and a second layer configured to be extended through the opening of the base. The first layer and the second layer may be configured to form a structure. The structure formed by the first layer and the second layer may be configured to extend through the opening of the base to an extended position. The first layer may be configured to engage the second layer to form the structure to extend through the opening. The first layer may be configured to separate from the second layer when retracted into the base. The structure may comprise a protrusion formed by the first layer with the second layer configured to move from a retracted position to the extended position. The protrusion may be configured to extend beyond the base by a first distance when the protrusion is in the retracted position and by a second distance greater than the first distance when the protrusion is in the extended position. The first layer may comprise a top and the second layer may comprise a bottom; the top may be configured to couple to the bottom to form the structure as the structure is moved toward the extended position. The structure may be configured to comprise at least one of (a) a protrusion; (b) a projection; (c) a cantilever; (d) a cantilever fixed at the base; (e) an extension; (f) a protrusion configured to cover a storage compartment of the base; (g) a support; (h) a support structure; (i) a semi-rigid structure; (j) a door; (k) a closure; (l) a cover; (m) a shelf; (n) a tray; (o) a partition; (p) a divider; (q) a separator; (r) an armrest; (s) a handle.

The present invention relates to a component for a vehicle interior comprising a base comprising an opening and a structure comprising a first layer and a second layer configured to extend through the opening of the base to an extended position. The structure may comprise a protrusion formed by the first layer with the second layer configured to move from a retracted position to the extended position. The protrusion may be formed as a support structure by engagement of the first layer with the second layer. The protrusion may comprise the first layer as a top and the second layer as a bottom; the top may be configured to couple to the bottom as the protrusion moves from the retracted position toward the extended position; the top may be configured to decouple from the bottom as the protrusion moves from the extended position toward the retracted position. The base may comprise a top track and a bottom track; the top track may be configured to guide movement of the top of the protrusion and the bottom track may be configured to guide movement of the bottom of the protrusion; the top track and the bottom track may be configured to direct the top of the protrusion and the bottom of the protrusion toward one another as the protrusion moves from the retracted position toward the extended position. The first layer may comprise a leading portion and a trailing portion and the second layer may comprise a leading portion and a trailing portion; the leading portion of the first layer may be coupled to the leading portion of the second layer when the protrusion is in the retracted position and the extended position; the trailing portion of the first layer may couple with the trailing portion of the second layer as the protrusion moves from the retracted position toward the extended position; the trailing portion of the first layer may separate from the trailing portion of the second layer as the protrusion moves from the extended position toward the retracted position. The first layer may comprise a set of knobs and the second layer may comprise a set of knobs; the set of knobs of the first layer may be configured to interlock with the set of knobs of the second layer as the protrusion moves from the retracted position to the extended position. The component may comprise a coupling configured to couple a leading edge of the first layer to a leading edge of the second layer; the coupling may comprise a user interface configured for application of an external force to move the protrusion between the retracted position and the extended position.

The present invention relates to a vehicle interior component comprising a base comprising an opening and a structure configured to be formed by a first layer configured to be extended through the opening of the base and a second layer configured to be extended through the opening of the base. The structure may be configured to be formed as the first layer and the second layer are extended through the opening of the base. The first layer may be configured to engage the second layer to form the structure to extend through the opening of the base so that the structure formed by the first layer and the second layer may be configured to extend through the opening of the base to an extended position. The first layer and the second layer may be retractable from the base; the first layer may be configured to separate from the second layer when retracted into the base. The first layer may be configured to engage the second layer to form the structure for the extended position; the first layer may be configured to separate from the second layer to retract into the opening of the base for a retracted position. The structure may comprise a semi-rigid structure formed when the first layer and the second layer are extended through the opening of the base. The first layer may comprise a substrate and a set of projections; the second layer may comprise a substrate and a set of projections. The substrate may comprise at least one of (a) a flexible substrate; (b) a surface; (c) a base; (d) a base layer (e) a sheet; (f) a pad; (g) a mat; (h) a covering; (i) a backing; (j) a rug; (k) a matrix; the set of projections may comprise features configured to facilitate engagement.

The present invention relates to a component for a vehicle interior. The component may comprise a base comprising an opening and a protrusion extending through the opening of the base. The protrusion may be configured to move from a retracted position to an extended position. The protrusion may extend beyond the base by a first distance when the protrusion is in the retracted position and a second distance greater than the first distance when the protrusion is in the extended position. The protrusion may comprise a top and a bottom. The top may be configured to couple to the bottom as the protrusion moves from the retracted position toward the extended position. The top may be configured to decouple from the bottom as the protrusion moves from the extended position to the retracted position. The base may comprise a top track and a bottom track. The top track may be configured to guide movement of the top of the protrusion. The bottom track may be configured to guide movement of the bottom of the protrusion. The top of the protrusion may comprise a set of extensions. The set of extensions may be configured to move within the top track. The top track and the bottom track may be configured to direct the top of the protrusion and the bottom of the protrusion toward one another as the protrusion moves from the retracted position toward the extended position. The top of the protrusion may comprise a leading portion and trailing portion. The bottom of the protrusion may comprise a leading portion and a trailing portion. The leading portion of the top may be coupled to the leading portion of the bottom when the protrusion is in the retracted position and the extended position. The trailing portion of the top may couple with the trailing portion of the bottom as the protrusion moves from the retracted position toward the extended position. The trailing portion of the top may separate from the trailing portion of the bottom as the protrusion moves from the extended position toward the retracted position. The trailing portion of the top may be decoupled from the trailing portion of the bottom when the protrusion is in the retracted position. The trailing portion of the top may be coupled to the trailing portion of the bottom when the protrusion is in the extended position. The top of the protrusion may comprise a set of knobs. The bottom of the protrusion may comprise a set of knobs. The set of knobs of the top of the protrusion may be configured to interlock with the set of knobs of the bottom of the protrusion. The set of knobs of the top of the protrusion may be configured to interlock with the set of knobs of the bottom of the protrusion in response to an external force. The set of knobs of the top of the protrusion may be configured to interlock with the set of knobs of the bottom of the protrusion as the protrusion moves from the retracted position to the extended position. The component may comprise a coupling. The coupling may be configured to couple a leading edge of the top of the protrusion to a leading edge of the bottom of the protrusion. The coupling may comprise a user interface configured for application of an external force to move the protrusion between the retracted position and the extended position. The component may comprise a storage compartment. The protrusion may be configured to cover the storage compartment when the protrusion is in the extended position. The protrusion may be configured to uncover the storage compartment when the protrusion is in the retracted position. The protrusion may comprise a cantilever fixed at the base. The protrusion may comprise at least one of: a tray, an armrest, a door, a cover.

The present invention also relates to a vehicle interior component. The component may comprise a base structure and a support configured to be formed from a first layer and a second layer. The first layer of the support may comprise a substrate and a set of projections. The second layer of the support may comprise a substrate and a set of projections. The first layer may be configured to engage the second layer to provide a semi-rigid structure. The first layer may be configured to be disengaged from the second layer to be stowed in the base structure. The first layer and the second layer may be retractable from the base structure. The first layer and the second layer may be extended from the base structure and engaged to provide the semi-rigid structure. The support may be configured to comprise at least one of (a) a protrusion; (b) a door; (c) a closure; (d) a cover; (e) a shelf; (f) a tray; (g) a partition; (h) a divider; (i) a separator; (j) a support structure; (k) an armrest. The semi-rigid structure may be configured to comprise at least one of (a) a protrusion; (b) a door; (c) a closure; (d) a cover; (e) a shelf; (f) a tray; (g) a partition; (h) a divider; (i) a separator; (j) a support structure; (k) an armrest. The base structure may comprise a set of tracks configured as a guide. The guide may be for the semi-rigid structure. The base structure may comprise a support member for at least one of the first layer and the second layer. The substrate may comprise at least one of (a) a flexible substrate; (b) a surface; (c) a base; (d) a base layer (e) a sheet; (f) a pad; (g) a mat; (h) a covering; (i) a backing; (j) a rug; (k) a matrix. The set of projections may comprise (a) a matrix; (b) a mesh; (c) a network; (d) a set of projections uniformly arranged; (e) pegs; (f) pins; (g) posts; (h) shafts; (i) filaments; (j) strands; (k) tufts; (l) piles; (m) bristles. The substrate may comprise a backing and the set of projections may comprise a network of generally uniformly distributed posts. The set of the projections of the substrate of one layer may be configured to engage with the set of the projections of the opposing substrate to form the semi-rigid structure. The semi-rigid structure may comprise a rigid structure. The semi-rigid structure may comprise a stiff structure. The semi-rigid structure may comprise a flexible support structure. The set of projections may comprise a set of semi-rigid projections. The set of projections may comprise a set of semi-rigid shafts on the substrate. The set of projections may comprise a mesh of flexible projections. The set of projections may comprise features configured to facilitate engagement. The features may comprise at least one of (a) caps; (b) bulbs; (c) heads; (d) tips. The features may be provided on at least a subset of the set of projections. The features may be configured to facilitate engagement and retention of the projections of each opposing substrate to retain the formation of the structure. Engagement of the first layer and second layer may substantially comprise a zipper arrangement.

DESCRIPTION

Figure 1A:
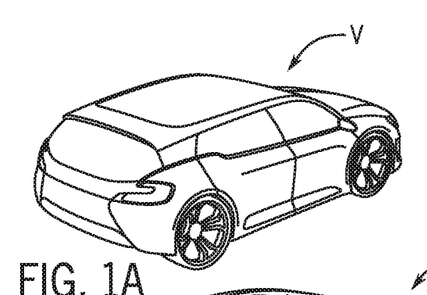
FIG. 1A is a schematic perspective view of a vehicle according to an exemplary embodiment.
Figure 1B:
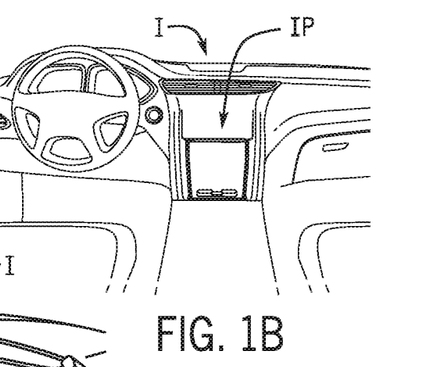
FIG. 1B is a schematic perspective view of a vehicle showing a vehicle interior according to an exemplary embodiment.
Figure 1C:
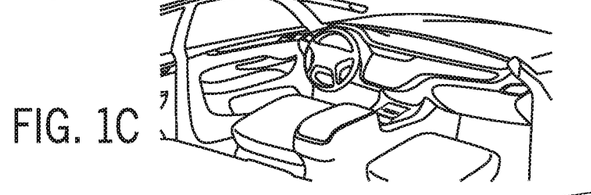
FIG. 1C is a schematic perspective view of a vehicle showing a vehicle interior according to an exemplary embodiment.

According to an exemplary embodiment as shown schematically in FIGS. 1A-1C, a vehicle V may comprise an interior I.

Figure 1D:
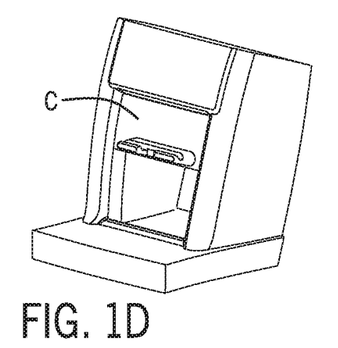
FIG. 1D is a schematic perspective view of a vehicle interior component shown as a console according to an exemplary embodiment.

According to an exemplary embodiment as shown schematically in FIG. 1D, a vehicle interior component may comprise a cover C and a storage compartment. Cover C may be configured to move between an extended position to cover the storage compartment and a retracted position to uncover the storage compartment. The protrusion may comprise a cantilever fixed at a base of the component.

Figure 1E:
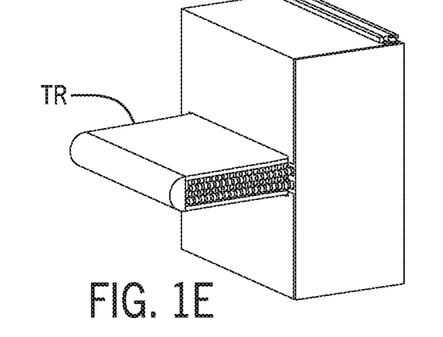
FIG. 1E is a schematic perspective view of a vehicle interior component shown as a console according to an exemplary embodiment.

According to an exemplary embodiment as shown schematically in FIG. 1E, a vehicle interior component may comprise a tray TR. Tray TR may be configured to move between an extended position to provide a cantilever fixed at a base of the component and a retracted position to store tray TR in the base of the component.

Figure 1F:
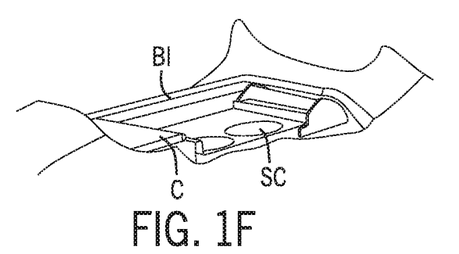
FIG. 1F is a schematic perspective view of a vehicle interior component shown as a console according to an exemplary embodiment.

According to an exemplary embodiment as shown schematically in FIG. 1F, a vehicle interior component may comprise a cover C and a storage compartment SC. Cover C may be configured to move between an extended position to cover storage compartment SC and a retracted position to uncover storage compartment SC. The protrusion may comprise a cantilever fixed at a base BI of the component.

Figure 1G:
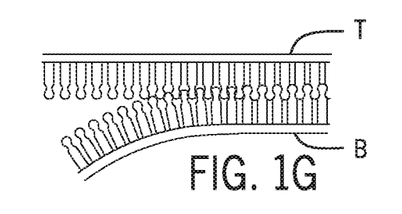
FIG. 1G is a schematic partial section view of a vehicle interior component according to an exemplary embodiment.
Figure 1H:
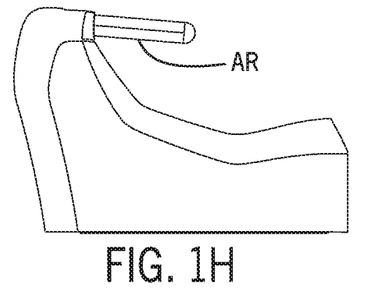
FIG. 1H is a schematic perspective view of a vehicle interior component shown as a console according to an exemplary embodiment.
Figure 1I:
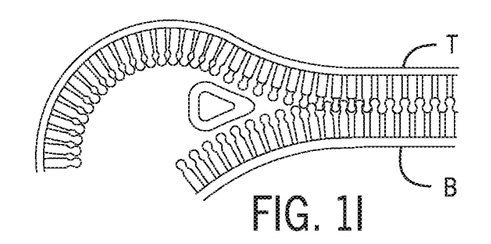
FIG. 1I is a schematic partial section view of a vehicle interior component according to an exemplary embodiment.

According to an exemplary embodiment as shown schematically in FIGS. 1G and 1I, a vehicle interior component may comprise a protrusion configured for movement between an extended position and a retracted position. The protrusion may comprise a top T and a bottom B. Top T may comprise a set of knobs. Bottom B may comprise a set of knobs. The set of knobs of top T may be configured to interlock with the set of knobs of bottom B. The set of knobs of top T may be configured to interlock with the set of knobs of bottom B as the protrusion moves from the retracted position to the extended position.

According to an exemplary embodiment as shown schematically in FIG. 1H, a vehicle interior component may comprise an armrest AR. Armrest AR may be configured to move between an extended position to provide a cantilever fixed at a base of the component and a retracted position to store armrest AR in the base of the component. Armrest AR may extend beyond the base of the component by a first distance when armrest AR is in the retracted position and a second distance greater than the first distance when armrest AR is in the extended position.

Figure 2A:
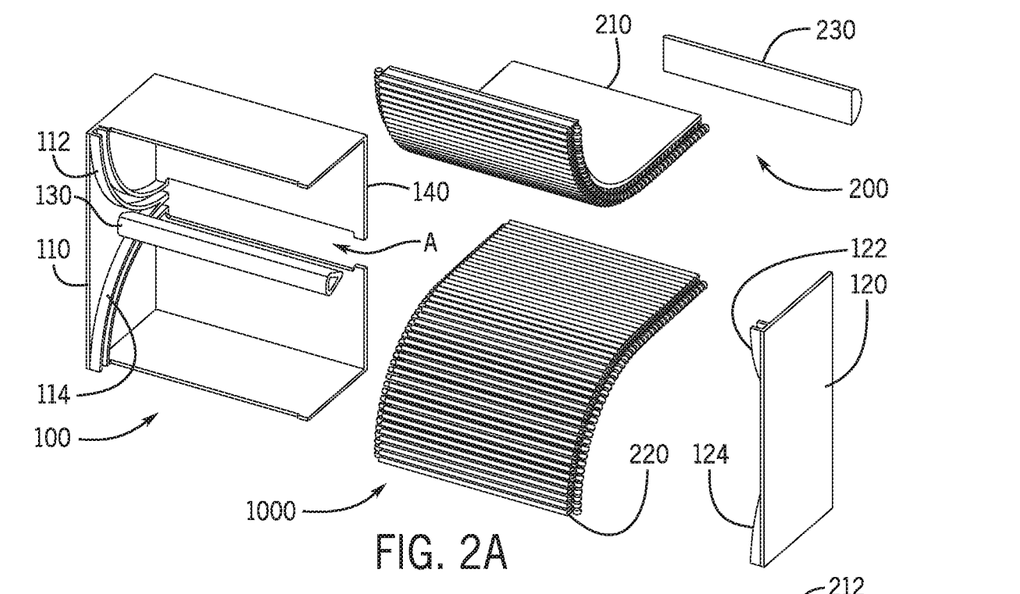
FIG. 2A is a schematic exploded perspective view of a vehicle interior component according to an exemplary embodiment.

According to an exemplary embodiment as shown schematically in FIG. 2A, a component 1000 for a vehicle interior may comprise a base 100 and a protrusion 200. Base 100 may comprise an opening or aperture A. Base 100 may comprise side walls 110 and 120, a support 130 and a front wall 140. Side wall 110 may comprise a top track 112 and a bottom track 114. Side wall 120 may comprise a top track 122 and a bottom track 124. Support 130 may extend between side wall 110 and side wall 120. Protrusion 200 may comprise a top 210, a bottom 220 and a coupling 230.

Figure 2B:
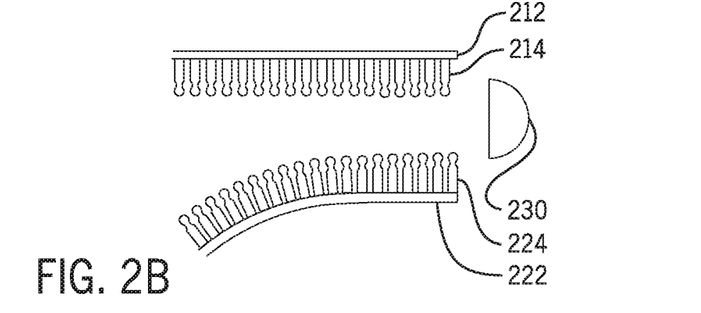
FIG. 2B is a schematic partial exploded section view of a vehicle interior component according to an exemplary embodiment.

According to an exemplary embodiment as shown schematically in FIG. 2B, top 210 of protrusion 200 may comprise a structure shown as providing a layer 212 and a set of knobs 214. Bottom 220 of protrusion 200 may comprise a structure shown as providing a layer 222 and a set of knobs 224. As shown schematically in FIGS. 1E, 1G and 1I, the projections/knobs of each structure/layer engage to form a protrusion/structure shown as support/tray 200/TR for the vehicle interior component. See also FIGS. 1A through 1I (generally showing structure such as tray TR, cover C, armrest AR, with top layer T and bottom layer B used in a component for vehicle interior I such as console or an instrument panel IP as may provide storage compartment SC in base BI).

Figure 2C:
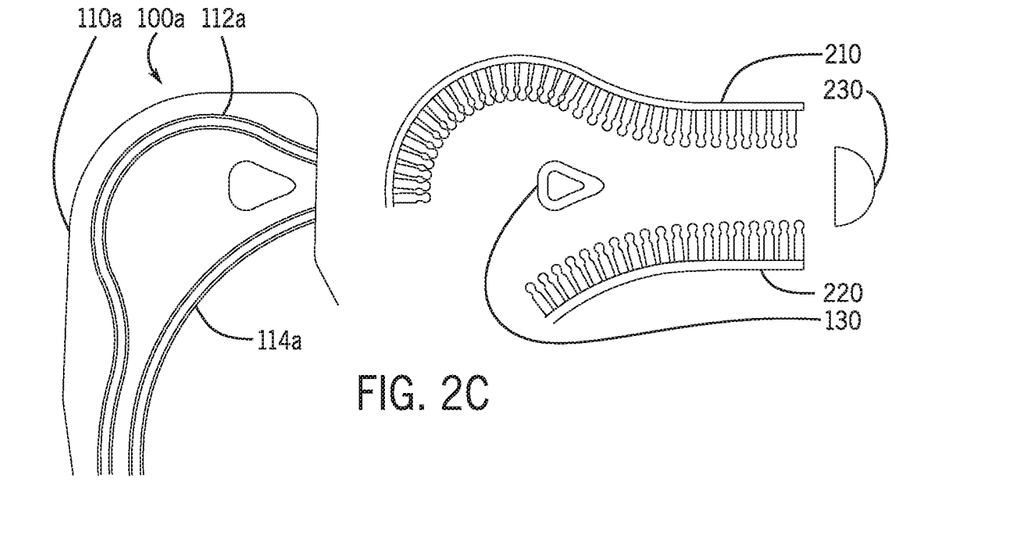
FIG. 2C is a schematic partial exploded section view of a vehicle interior component according to an exemplary embodiment.

According to an exemplary embodiment as shown schematically in FIG. 2C, component 1000 may comprise a base 100*a*. Base 100 may comprise side wall 110*a*. Side wall 110*a* may comprise a top track 112*a* and a bottom track 114*a*.

Top track 112/122/112*a* may be configured to guide movement of top 210 of protrusion 200. Bottom track 114/124/114*a* may be configured to guide movement of bottom 220 of protrusion 200. The top track and the bottom track may be configured to direct top 210 of protrusion 200 and bottom 220 of protrusion 200 toward one another as the protrusion moves from the retracted position toward the extended position.

Figure 3A:
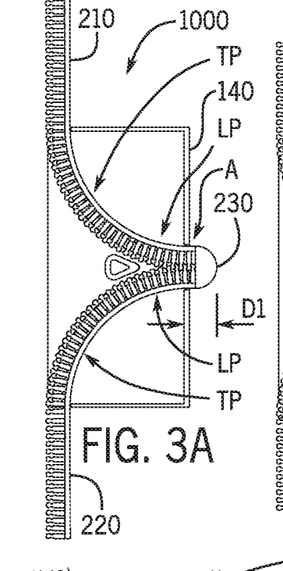
FIGS. 3A-3C are schematic partial section views of a vehicle interior component according to an exemplary embodiment.
Figure 3B:
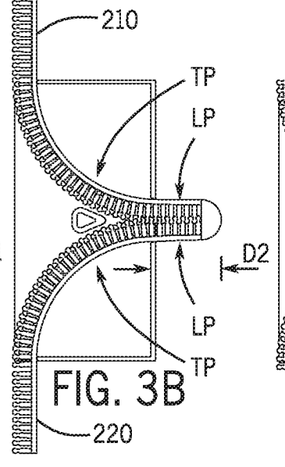
Figure 3C:
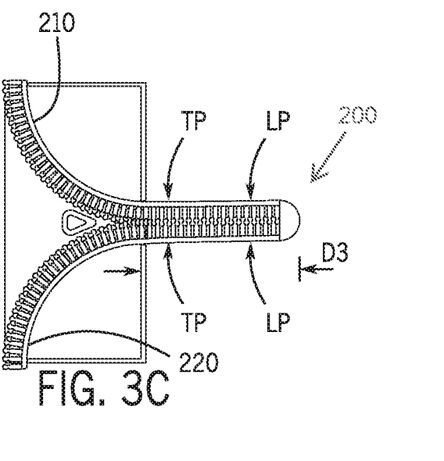
Figures 3D, 3E:
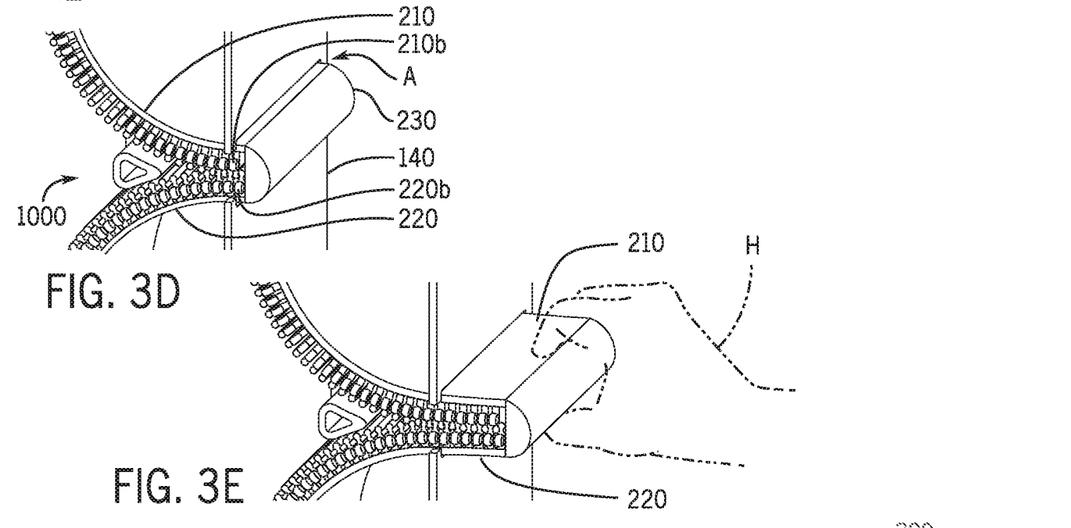
FIGS. 3D-3F are schematic partial perspective views of a vehicle interior component according to an exemplary embodiment.
Figure 4A:
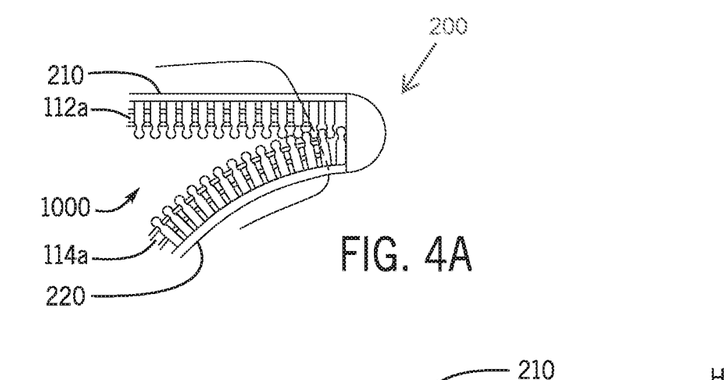
FIGS. 4A-4C are schematic partial section views of a vehicle interior component according to an exemplary embodiment.
Figure 4B:
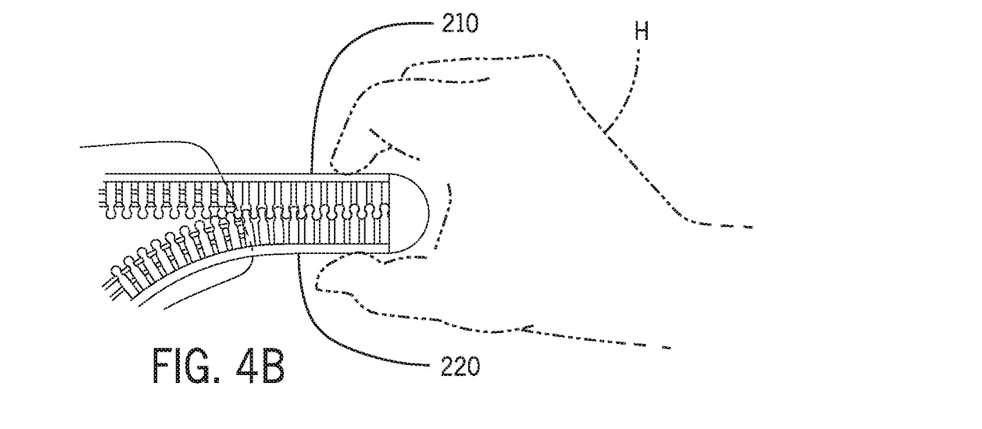
Figure 4C:
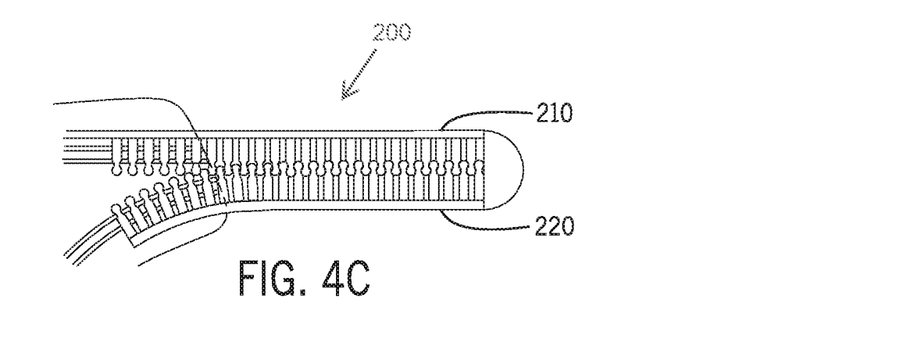
Figure 5A:
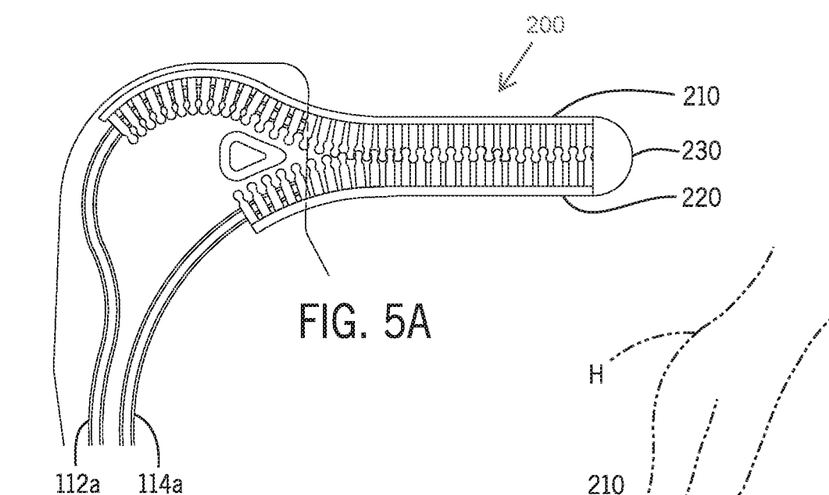
FIGS. 5A-5C are schematic partial section views of a vehicle interior component according to an exemplary embodiment.
Figure 5B:
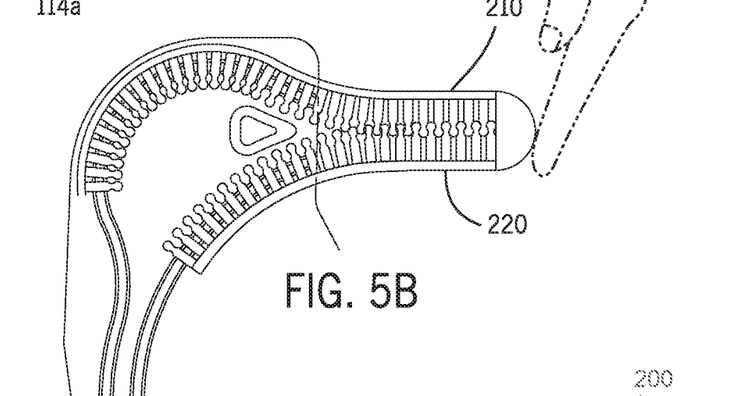
Figure 5C:
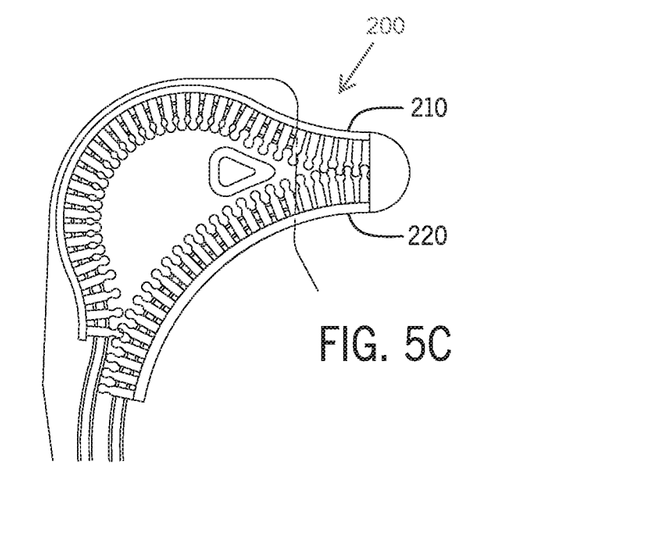

According to an exemplary embodiment as shown schematically in FIGS. 3A and 3D, component 1000 may comprise base 100 and protrusion 200 extending through opening A of base 100. Protrusion 200 may be configured to move from a retracted position as shown schematically in FIGS. 3A and 3D to an extended position as shown schematically in FIGS. 3B, 3C, 3E and 3F. Protrusion 200 may extend beyond base 100 by a first distance D1 when protrusion 200 is in the retracted position and a second distance D2/D3 greater than first distance D1 when the protrusion is in the extended position. Protrusion 200 may comprise top 210 and bottom 220. As shown schematically in FIGS. 3A-3F, top 210 may be configured to couple to bottom 220 as protrusion 200 moves from the retracted position toward the extended position. Top 210 may be configured to decouple from bottom 220 as protrusion 200 moves from the extended position (as shown schematically in FIGS. 3B/3C and 3F/3E) to the retracted position (as shown schematically in FIGS. 3A and 3D). Top 210 of protrusion 200 may comprise a leading portion LP and trailing portion TP. Bottom 220 of protrusion 200 may comprise a leading portion LP and a trailing portion TP. Leading portion LP of top 210 may be coupled to leading portion LP of bottom 220 when protrusion 200 is in the retracted position and the extended position. Trailing portion TP of top 210 may couple with trailing portion TP of bottom 220 as protrusion 200 moves from the retracted position toward the extended position. Trailing portion TP of top 210 may separate from trailing portion TP of bottom 220 as protrusion 200 moves from the extended position toward the retracted position (see FIGS. 5A-5C). Trailing portion TP of top 210 may be decoupled from trailing portion TP of bottom 220 when protrusion 200 is in the retracted position. Trailing portion TP of top 210 may be coupled to trailing portion TP of bottom 220 when protrusion 200 is in the extended position. As shown schematically in FIGS. 3A-3F, 4A-4C and 5A-5C, set of knobs 214 of top 210 of protrusion 200 may be configured to interlock with set of knobs 224 of bottom 220 of protrusion 200. Set of knobs 214 of top 210 of protrusion 200 may be configured to interlock with set of knobs 224 of bottom 220 of protrusion 200 in response to an external force. Set of knobs 214 of top 210 of protrusion 200 may be configured to interlock the set of knobs 224 of bottom 220 of protrusion 200 as protrusion 200 moves from the retracted position to the extended position. As shown schematically in FIGS. 3A-3F, 4A-4C and 5A-5C, coupling 230 may be configured to couple a leading edge of top 210 of protrusion 200 to a leading edge of bottom 220 of protrusion 200. Coupling 230 may comprise a user interface configured for application of an external force (e.g. from a hand H as shown schematically in FIGS. 3E, 4B and 5B) to move protrusion 200 between the retracted position and the extended position.

Figure 3F:
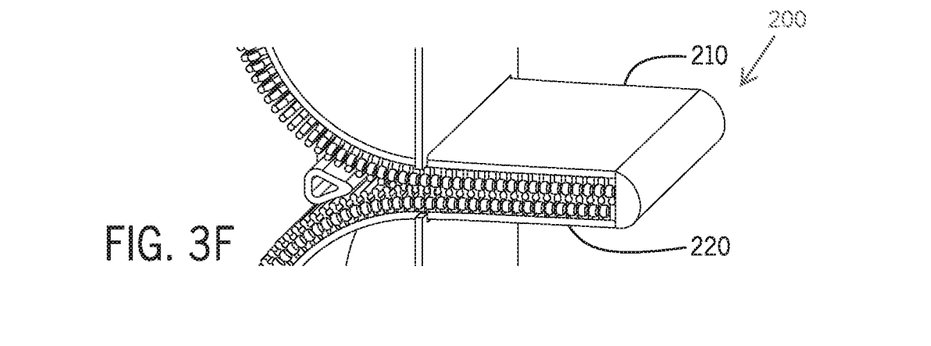

As shown schematically in FIGS. 3D-3F, top 210 of protrusion 200 may comprise a set of extensions 210b. Set of extensions 210b may be configured to move within top track 112/122/112a. Bottom 220 of protrusion 200 may comprise a set of extensions 220b. Set of extensions 220b may be configured to move within bottom track 114/124/114a.

According to an exemplary embodiment as shown schematically in FIGS. 4A-4C and 5A-5C, top track 112a may be configured to guide movement of top 210 of protrusion 200. Bottom track 114a may be configured to guide movement of bottom 220 of protrusion 200. Top track 112a and bottom track 114a may be configured to direct top 210 of protrusion 200 and bottom 220 of protrusion 200 toward one another as protrusion 200 moves from the retracted position (as shown schematically in FIGS. 4A and 5A) toward the extended position (as shown schematically in FIGS. 4B/4C and 5B/5C).

According to an exemplary embodiment, component 100 may comprise a storage compartment. Protrusion 200 may be configured to cover the storage compartment when protrusion 200 is in the extended position. Protrusion 200 may be configured to uncover the storage compartment when protrusion 200 is in the retracted position. Protrusion 200 may comprise a cantilever fixed at the base. Protrusion 200 may comprise at least one of: a tray, an armrest, a door, a cover.

According to an exemplary embodiment as indicated schematically the vehicle interior component shown as a protrusion in FIGS. 1E, 3A-3F, 4A-4C and 5A-5C may be constructed and configured in a variety of forms/arrangements for use in multiple applications/structures in a vehicle interior, such as providing a door/closure or cover (see FIG. 1D), a shelf/tray (see FIG. 1E), a partition or divider/separator (see FIG. 1F), a structure/armrest (see FIG. 1H); the component may be used in an instrument panel, console assembly, overhead system, entertainment center, door panel, etc. See also FIG. 2A (exploded view of base structure 140/100 with tracks 112 and 114 for guiding protrusion formed from a set of substrate sheets 210 and 220). As shown schematically according to an exemplary embodiment in FIGS. 1G, 1I and 2A-2C, the component may comprise a set of opposing flexible substrates/surfaces (e.g. base/base layer, sheet, pad, mat, covering, backing, rug, etc.) that comprise a set of projections (e.g. pegs, pins, posts, shafts, filaments, strands, tufts, piles, bristles, etc.); the projections of one substrate/surface T are configured to engage with the projections of the opposing substrate B to form a rigid/semi-rigid structure (see FIGS. 1E and 1H); the projections/substrate layers may be separated into a disengaged flexible/retracted condition (e.g. to disassemble the structure). See also FIGS. 3A-3F, 4A-4C and 5A-5C. As shown schematically according to an exemplary embodiment in FIGS. 1G and 2A-2C, the component may comprise a base structure 100/140 providing tracks 112 and 114 for guiding a set of substrate sheets 210 and 220 that engage to form the rigid/semi-rigid structure (e.g. protrusion, door, cover, etc.); the base/base structure 100/140 may comprise a support/support member 130 for the protrusion/structure. See also FIGS. 3A-3F and 5A-5C (extendable/retractable action to engage/disengage the component). As indicated schematically according to an exemplary embodiment in FIGS. 3A-3C, 3D-3F, 4A-4C and 5A-5C, semi-rigid projections/shafts on the substrate/sheet layer may comprise features (e.g. caps, bulbs, heads, etc.) configured to facilitate engagement and retention of the projections of each opposing substrate/sheet to retain the formation of the structure (e.g. protrusion with rigid stiffness).

Exemplary Embodiments

According to an exemplary embodiment as shown schematically in 2A-2C, 3A-3F, 4A-4C and 5A-5C, a component for a vehicle interior may comprise a base comprising an opening, a first layer configured to be extended through the opening of the base and a second layer configured to be extended through the opening of the base. See also FIGS. 1A through 1I (generally showing structure such as tray TR, cover C, armrest AR, with top layer T and bottom layer B used in a component for vehicle interior I such as console or an instrument panel IP as may provide storage compartment SC in base BI). The first layer and the second layer may be configured to form a structure. See e.g. FIGS. 1D-1I, 3A-3F, 4A-4C and 5A-5C. (Structure such as cover C, tray TR, armrest AR, support/protrusion comprising top layer/structure T/210 and bottom layer/structure B/220) The structure formed by the first layer and the second layer may be configured to extend through the opening of the base to an extended position; the first layer may be configured to engage the second layer to form the structure to extend through the opening; the first layer may be configured to separate from the second layer when retracted into the base. See e.g. FIGS. 1E, 3A-3F, 4A-4C and 5A-5C. The structure may comprise a protrusion formed by the first layer with the second layer configured to move from a retracted position to the extended position. The protrusion may be configured to extend beyond the base by a first distance when the protrusion is in the retracted position and by a second distance greater than the first distance when the protrusion is in the extended position. The first layer may comprise a top and the second layer may comprise a bottom; the top may be configured to couple to the bottom to form the structure as the structure is moved toward the extended position. The structure may be configured to comprise at least one of (a) a protrusion; (b) a projection; (c) a cantilever; (d) a cantilever fixed at the base; (e) an extension; (f) a protrusion configured to cover a storage compartment of the base; (g) a support; (h) a support structure; (i) a semi-rigid structure; (j) a door; (k) a closure; (l) a cover; (m) a shelf; (n) a tray; (o) a partition; (p) a divider; (q) a separator; (r) an armrest; (s) a handle. See e.g. FIGS. 1B and 1D-1I.

According to an exemplary embodiment as shown schematically in FIGS. 2A-2C, 3A-3F, 4A-4C and 5A-5C, a component for a vehicle interior may comprise a base comprising an opening and a structure comprising a first layer and a second layer configured to extend through the opening of the base to an extended position. See also FIGS. 1A through 1I (generally showing structure such as tray TR, cover C, armrest AR, with top layer T and bottom layer B used in a component for vehicle interior I such as console or an instrument panel IP as may provide storage compartment SC in base BI). The structure may comprise a protrusion formed by the first layer with the second layer configured to move from a retracted position to the extended position. See e.g. FIGS. 1B, 1D-1I, 3A-3F, 4A-4C and 5A-5C. (Structure such as cover C, tray TR, armrest AR, support/protrusion comprising top layer/structure T/210 and bottom layer/structure B/220) The protrusion may be formed as a support structure by engagement of the first layer with the second layer. The protrusion may comprise the first layer as a top and the second layer as a bottom; the top may be configured to couple to the bottom as the protrusion moves from the retracted position toward the extended position; the top may be configured to decouple from the bottom as the protrusion moves from the extended position toward the retracted position. The base may comprise a top track and a bottom track; the top track may be configured to guide movement of the top of the protrusion and the bottom track may be configured to guide movement of the bottom of the protrusion; the top track and the bottom track may be configured to direct the top of the protrusion and the bottom of the protrusion toward one another as the protrusion moves from the retracted position toward the extended position. See e.g. FIGS. 2A, 2C and 5A-5C (shown as top track 112/122/112a and bottom track 114/124/114a). The first layer may comprise a leading portion and a trailing portion and the second layer may comprise a leading portion and a trailing portion; the leading portion of the first layer may be coupled to the leading portion of the second layer when the protrusion is in the retracted position and the extended position; the trailing portion of the first layer may couple with the trailing portion of the second layer as the protrusion moves from the retracted position toward the extended position; the trailing portion of the first layer may separate from the trailing portion of the second layer as the protrusion moves from the extended position toward the retracted position. See e.g. FIGS. 3A-3C (shown as leading portion LP and trailing portion TP). The first layer may comprise a set of knobs and the second layer may comprise a set of knobs; the set of knobs of the first layer may be configured to interlock with the set of knobs of the second layer as the protrusion moves from the retracted position to the extended position. See e.g. FIGURES (showing projections/knobs 214 and 224 on substrate 212 and 222). The component may comprise a coupling configured to couple a leading edge of the first layer to a leading edge of the second layer; the coupling may comprise a user interface configured for application of an external force to move the protrusion between the retracted position and the extended position.

According to an exemplary embodiment as shown schematically in FIGS. 2A-2C, 3A-3F, 4A-4C and 5A-5C, a vehicle interior component may comprise a base comprising an opening and a structure configured to be formed by a first layer configured to be extended through the opening of the base and a second layer configured to be extended through the opening of the base. See also FIGS. 1A through 1I (generally showing structure such as tray TR, cover C, armrest AR, with top layer T and bottom layer B used in a component for vehicle interior I such as console or an instrument panel IP as may provide storage compartment SC in base BI). The structure may be configured to be formed as the first layer and the second layer are extended through the opening of the base. The first layer may be configured to engage the second layer to form the structure to extend through the opening of the base so that the structure formed by the first layer and the second layer may be configured to extend through the opening of the base to an extended position. The first layer and the second layer may be retractable from the base; the first layer may be configured to separate from the second layer when retracted into the base. The first layer may be configured to engage the second layer to form the structure for the extended position; the first layer may be configured to separate from the second layer to retract into the opening of the base for a retracted position. The structure may comprise a semi-rigid structure formed when the first layer and the second layer are extended through the opening of the base. See e.g. FIGS. 1E, 1F, 1H, 3A-3F, 4A-4C and 5A-5C. The first layer may comprise a substrate and a set of projections; the second layer may comprise a substrate and a set of projections. The substrate may comprise at least one of (a) a flexible substrate; (b) a surface; (c) a base; (d) a base layer (e) a sheet; (f) a pad; (g) a mat; (h) a covering; (i) a backing; (j) a rug; (k) a matrix; the set of projections may comprise features configured to facilitate engagement. The set of projections may comprise (a) a matrix; (b) a mesh; (c) a network; (d) a set of projections uniformly arranged; (e) pegs; (f) pins; (g) posts; (h) shafts; (i) filaments; (j) strands; (k) tufts; (l) piles; (m) bristles. The set of the projections of the substrate of one layer may be configured to engage with the set of the projections of the opposing substrate to form the semi-rigid structure. The set of projections may comprise a mesh of flexible projections. The features may comprise at least one of (a) caps; (b) bulbs; (c) heads; (d) tips. The features may be configured to facilitate engagement and retention of the projections of each opposing substrate to retain the formation of the structure. Engagement of the first layer and the second layer may substantially comprise a zipper arrangement. See e.g. FIGS. 1G, 1I, 3A-3F, 4A-4C and 5A-5C. The first layer may be configured to be disengaged from the second layer to be stowed in the base. See e.g. FIG. 5C. The component may further comprise a storage compartment; the structure may comprise a protrusion; the protrusion may be configured to cover the storage compartment when the protrusion is in the extended position; the protrusion may be configured to uncover the storage compartment when the protrusion is in the retracted position. See e.g. FIGS. 1B, 1D and 1F.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A vehicle interior component, comprising:
   a base comprising an opening; and
   a structure comprising a first layer configured to be extended through the opening of the base and a second layer configured to be extended through the opening of the base, wherein the structure is formed when the first layer and the second layer are extended through the opening of the base;
   wherein each of the first layer and the second layer comprises a substrate and a set of projections, each of the projections comprising a distal knob,
   wherein upon being extended through the opening of the base the first layer engages the second layer via the set of projections of the first layer interdigitating with the set of projections of the second layer and interlocking via the distal knobs to form an extended position, and
   wherein upon being retracted through the opening of the base the first layer separates from the second layer to form a retracted position.

2. The vehicle interior component of claim 1, wherein the structure comprises at least one of (a) a protrusion; (b) a projection; (c) a cantilever; (d) a cantilever fixed at the base; (e) an extension; (f) a protrusion configured to cover a storage compartment of the base; (g) a support; (h) a support structure; (i) a semi-rigid structure; (j) a door; (k) a closure; (l) a cover; (m) a shelf; (n) a tray; (o) a partition; (p) a divider; (q) a separator; (r) an armrest; (s) a handle.

3. The vehicle interior component of claim 1, wherein the structure comprises a protrusion formed by the first layer with the second layer configured to move from the retracted position to the extended position.

4. The vehicle interior component of claim 3, wherein the protrusion extends beyond the base by a first distance when the protrusion is in the retracted position and by a second distance greater than the first distance when the protrusion is in the extended position.

5. The vehicle interior component of claim 3, wherein the protrusion comprises the first layer as a top portion and the second layer as a bottom portion.

6. The vehicle interior component of claim 5, wherein the base comprises a top track and a bottom track; wherein the top track guides movement of the top portion of the protrusion and the bottom track is configured to guide movement of the bottom portion of the protrusion; wherein the top track and the bottom track are configured to direct the top portion of the protrusion and the bottom portion of the protrusion toward one another as the protrusion moves from the retracted position toward the extended position.

7. The vehicle interior component of claim 6, wherein each of the first layer and the second layer comprises a leading portion and a trailing portion; wherein the leading portion of the first layer is engaged to the leading portion of the second layer when the protrusion is in the retracted position and the extended position; wherein the trailing portion of the first layer couples with the trailing portion of the second layer as the protrusion moves from the retracted position toward the extended position; wherein the trailing portion of the first layer separates from the trailing portion of the second layer as the protrusion moves from the extended position toward the retracted position.

8. The vehicle interior component of claim 7, wherein top track and the bottom track are configured such that upon being in the retracted position a portion of the trailing portion of the first layer re-engages with a portion of the trailing portion of the second layer.

9. The vehicle interior component of claim 6, comprising a coupling that couples a leading edge of the first layer to a leading edge of the second layer; wherein the coupling comprises a user interface configured for application of an external force to move the protrusion between the retracted position and the extended position.

10. The vehicle interior component of claim 1, wherein the substrate comprises at least one of (a) a flexible substrate; (b) an integrally-formed surface; (c) a base; (d) a base layer (e) a sheet; (f) a pad; (g) a mat; (h) a covering; (i) a backing; (j) a rug; (k) a matrix.

11. The vehicle interior component of claim 1, wherein the structure comprises a semi-rigid structure.

12. A vehicle interior component, comprising:
   a base comprising an opening; and
   a structure comprising a first layer configured to be extended through the opening of the base and a second layer configured to be extended through the opening of the base, wherein the structure is formed when the first layer and the second layer are extended through the opening of the base to form an extended position;

wherein upon being retracted through the opening of the base the first layer separates from the second layer to form a retracted position;

wherein the base comprises a first side wall, a second side wall and a support extending between the first side wall and the second side wall;

wherein the first side wall, the second side wall and the support are integrally connected with the base;

wherein each of the first side wall and the second side wall comprises a top track and a bottom track;

wherein the support is positioned between the top track and the bottom track of the first side wall and the second side wall;

wherein the support extending between the first and second side walls and the top tracks of the first and second side walls guides movement of the first layer;

wherein the support extending between the first and second side walls and the bottom tracks of the first and second side walls guides movement of the second layer.

13. The vehicle interior component of claim 12, wherein the structure comprises a protrusion formed by the first layer with the second layer configured to move from the retracted position to the extended position.

14. The vehicle interior component of claim 12, wherein the structure comprises at least one of (a) a protrusion; (b) a projection; (c) a cantilever; (d) a cantilever fixed at the base; (e) an extension; (f) a protrusion configured to cover a storage compartment of the base; (g) a support; (h) a support structure; (i) a semi-rigid structure; (j) a door; (k) a closure; (l) a cover; (m) a shelf; (n) a tray; (o) a partition; (p) a divider; (q) a separator; (r) an armrest; (s) a handle.

15. The vehicle interior component of claim 12, wherein the substrate comprises at least one of (a) a flexible substrate; (b) an integrally-formed surface; (c) a base; (d) a base layer (e) a sheet; (f) a pad; (g) a mat; (h) a covering; (i) a backing; (j) a rug; (k) a matrix.

16. A vehicle interior component, comprising:
a base comprising an opening; and
a structure comprising a first layer configured to be extended through the opening of the base and a second layer configured to be extended through the opening of the base, wherein the structure is formed when the first layer and the second layer are extended through the opening of the base to form an extended position;

wherein upon being retracted through the opening of the base the first layer separates from the second layer to form a retracted position;

wherein the base comprises a first side wall, a second side wall and a support extending between the first side wall and the second side wall;

wherein each of the first side wall and the second side wall comprises a top track and a bottom track;

wherein the support is positioned between the top track and the bottom track of the first side wall and the second side wall;

wherein each of the first layer and the second layer comprises a leading portion and a trailing portion;

wherein the top tracks and the bottom tracks are configured to direct the trailing portions of the first layer and the second layer toward one another as the first layer and second layer move toward the retracted position.

17. The vehicle interior component of claim 16, wherein the top track and the bottom track are configured such that upon being in the retracted position a portion of the first layer re-engages with a portion of the second layer.

18. The vehicle interior component of claim 16, wherein the structure comprises a protrusion formed by the first layer with the second layer configured to move from the retracted position to the extended position.

19. The vehicle interior component of claim 16, wherein the structure comprises at least one of (a) a protrusion; (b) a projection; (c) a cantilever; (d) a cantilever fixed at the base; (e) an extension; (f) a protrusion configured to cover a storage compartment of the base; (g) a support; (h) a support structure; (i) a semi-rigid structure; (j) a door; (k) a closure; (l) a cover; (m) a shelf; (n) a tray; (o) a partition; (p) a divider; (q) a separator; (r) an armrest; (s) a handle.

20. The vehicle interior component of claim 16, wherein the substrate comprises at least one of (a) a flexible substrate; (b) an integrally-formed surface; (c) a base; (d) a base layer (e) a sheet; (f) a pad; (g) a mat; (h) a covering; (i) a backing; (j) a rug; (k) a matrix.

* * * * *